(12) United States Patent
Velasquez

(10) Patent No.: US 9,876,885 B1
(45) Date of Patent: Jan. 23, 2018

(54) CELL PHONE CASE WITH INTEGRATED HOOKS

(71) Applicant: Luis Velasquez, Miami Beach, FL (US)

(72) Inventor: Luis Velasquez, Miami Beach, FL (US)

( * ) Notice: Subject to any disclaimer, the term of this patent is extended or adjusted under 35 U.S.C. 154(b) by 0 days.

(21) Appl. No.: 15/652,377

(22) Filed: Jul. 18, 2017

(51) Int. Cl.
| H04B 1/00 | (2006.01) |
| H04M 1/02 | (2006.01) |
| A45C 11/00 | (2006.01) |
| H04B 1/3877 | (2015.01) |

(52) U.S. Cl.
CPC ........... *H04M 1/0297* (2013.01); *A45C 11/00* (2013.01); *H04B 1/3877* (2013.01); *A45C 2011/002* (2013.01)

(58) Field of Classification Search
CPC ........................................................ H04B 1/03
USPC ........................................... 455/575.1, 575.8
See application file for complete search history.

(56) References Cited

U.S. PATENT DOCUMENTS

| D647,085 | S | 10/2011 | Chung | |
| 8,086,285 | B2 * | 12/2011 | McNamara | H04B 1/3888 |
| | | | | 379/426 |
| 8,374,661 | B2 | 2/2013 | Fratti | |
| 8,496,144 | B2 | 7/2013 | Son | |
| 8,636,183 | B1 | 1/2014 | Steiner | |
| 9,407,743 | B1 | 8/2016 | Hirshberg | |
| 2012/0329534 | A1 * | 12/2012 | Barnett | F16M 11/10 |
| | | | | 455/575.8 |
| 2014/0008405 | A1 | 1/2014 | Beaver | |
| 2015/0111626 | A1 * | 4/2015 | Bell | G06F 1/1637 |
| | | | | 455/575.8 |
| 2015/0288409 | A1 * | 10/2015 | Forsythe | H04B 1/3888 |
| | | | | 455/575.6 |
| 2015/0331448 | A1 * | 11/2015 | Truong | G06F 1/1616 |
| | | | | 455/575.8 |
| 2015/0341071 | A1 * | 11/2015 | Truchalska | A45F 5/004 |
| | | | | 455/575.8 |

FOREIGN PATENT DOCUMENTS

WO 2014036570 3/2014

* cited by examiner

*Primary Examiner* — Wen Huang
(74) *Attorney, Agent, or Firm* — Kyle A. Fletcher, Esq.

(57) ABSTRACT

The cell phone case with integrated hooks is configured for use with a personal data device. The cell phone case with integrated hooks is a housing that contains the personal data device. The cell phone case with integrated hooks comprises a housing, a plurality of fasteners, and a removable pad. The plurality of fasteners are retractably installed within the housing. Each of the plurality of fasteners attach the housing to a vertical surface such that the personal data device may be hung from the vertical surface thereby allowing the personal data device to be used in a hands free manner. The removable pad provides an anchor point for use by the plurality of fasteners when hanging the personal data device.

16 Claims, 4 Drawing Sheets

CELL PHONE CASE WITH INTEGRATED HOOKS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal and domestic items including travelling articles, more specifically, a case for a portable handheld communication device.

SUMMARY OF INVENTION

The cell phone case with integrated hooks is configured for use with a personal data device. The cell phone case with integrated hooks is a housing that contains the personal data device. The cell phone case with integrated hooks comprises a housing, a plurality of fasteners, and a removable pad. The plurality of fasteners are retractably installed within the housing. Each of the plurality of fasteners attach the housing to a vertical surface such that the personal data device may be hung from the vertical surface thereby allowing the personal data device to be used in a hands free manner. The removable pad provides an anchor point for use by the plurality of fasteners when hanging the personal data device.

These together with additional objects, features and advantages of the cell phone case with integrated hooks will be readily apparent to those of ordinary skill in the art upon reading the following detailed description of the presently preferred, but nonetheless illustrative, embodiments when taken in conjunction with the accompanying drawings.

In this respect, before explaining the current embodiments of the cell phone case with integrated hooks in detail, it is to be understood that the cell phone case with integrated hooks is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the cell phone case with integrated hooks.

It is therefore important that the claims be regarded as including such equivalent construction insofar as they do not depart from the spirit and scope of the cell phone case with integrated hooks. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
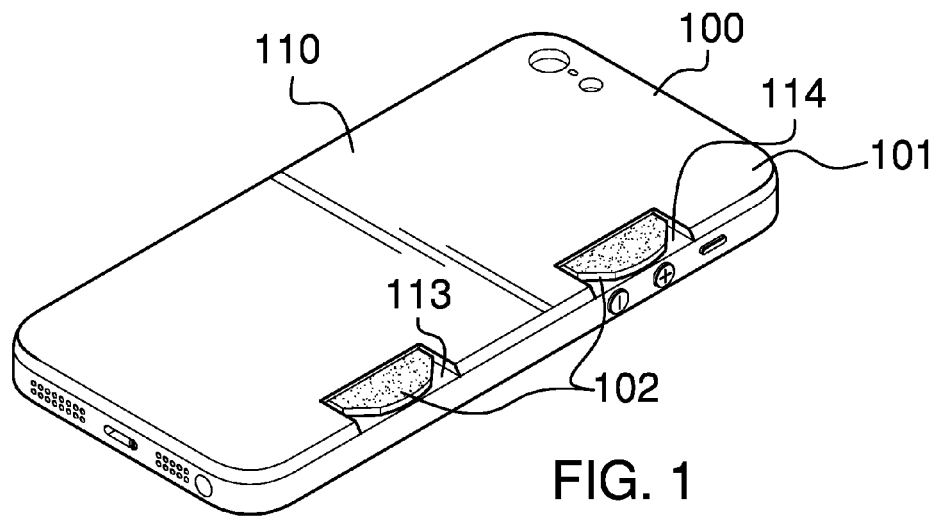
FIG. 1 is a perspective view of an embodiment of the disclosure.
Figure 2:
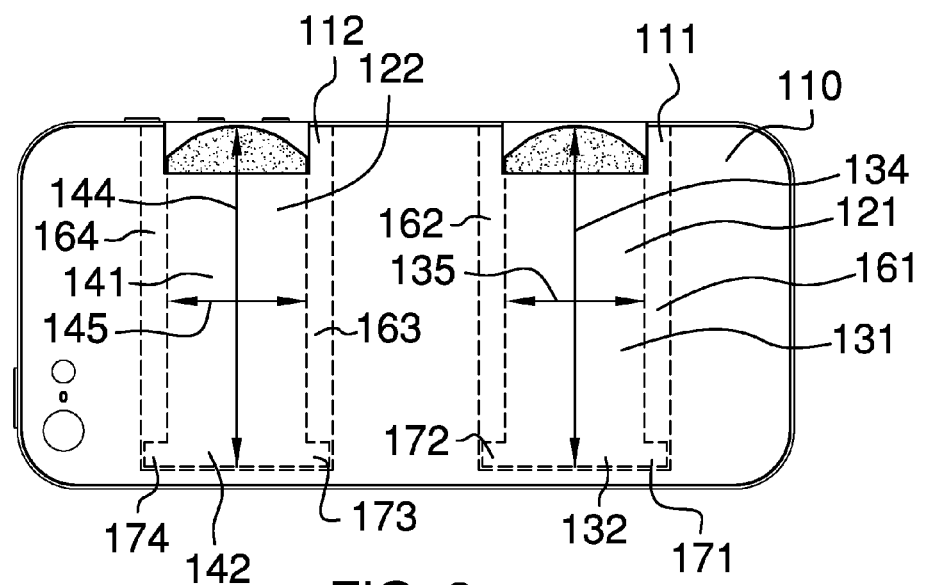
FIG. 2 is a back view of an embodiment of the disclosure.
Figure 3:
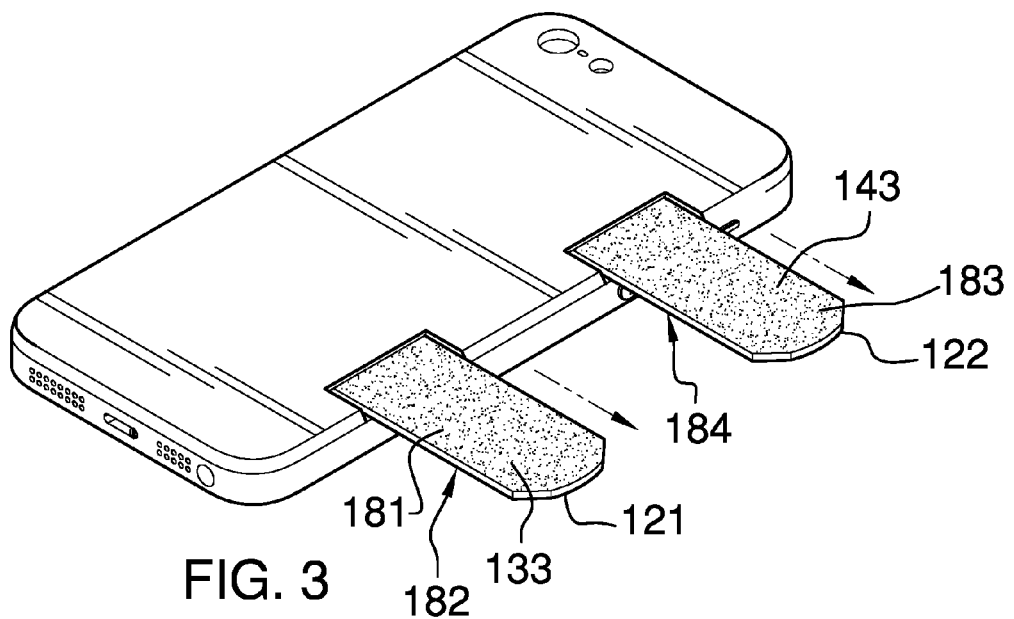
FIG. 3 is a detail view of an embodiment of the disclosure.
Figure 4:
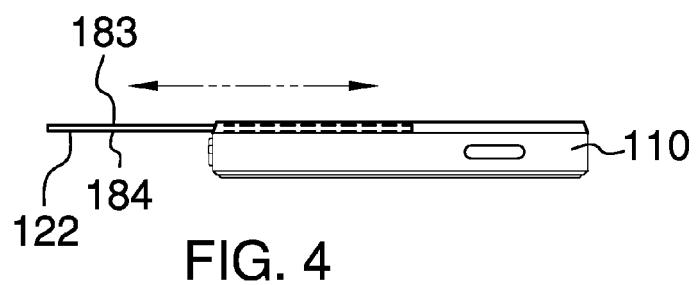
FIG. 4 is a top view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 7.

The cell phone case with integrated hooks 100 (hereinafter invention) is configured for use with a personal data device 191. The invention 100 is a housing 101 that contains the personal data device 191. The invention 100 comprises a housing 101, a plurality of fasteners 102, and a removable pad 103. The plurality of fasteners 102 are retractably installed within the housing 101. Each of the plurality of fasteners 102 attach the housing 101 to a vertical surface 192 such that the personal data device 191 may be hung from the vertical surface 192 thereby allowing the personal data device 191 to be used in a hands free manner. The removable pad 103 provides an anchor point for use by the plurality of fasteners 102 when hanging the personal data device 191. The personal data device 191 is discussed in greater detail elsewhere in this disclosure. The vertical surface 192 is a surface that is parallel to the force of gravity upon which the invention 100 will be hung.

The housing 101 is a rigid structure that is intended to contain the personal data device 191. Such structures are well known and documented in the commercial market. In the first potential embodiment of the disclosure, the housing 101 further contains the plurality of fasteners 102. The housing 101 comprises a container 110, a first slot 111, and a second slot 112.

The container 110 is a semi-rigid hollow rectangular block structure that is formed with an open face. The personal data device 191 is physically stored within the container 110 such that the personal data device 191 may be accessed through the open face of the container 110. The semi-rigid structure of the container 110 is elastic in nature.

The first slot 111 is a negative space that is formed in the housing 101. The first slot 111 is formed in the shape of a rectangular block. The inner dimensions of the first slot 111 are greater than the outer dimensions of each of the plurality of fasteners 102 such that a fastener selected from the plurality of fasteners 102 may be inserted into the first slot 111. The first slot 111 comprises a first track 161 and a second track 162. The first track 161 is a groove that is formed parallel to a first first length direction 134 edge of the first rectangular strip 131. The second track 162 is a groove that is formed parallel to a second first length direction 134 edge of the first rectangular strip 131. The directional references used in this disclosure are discussed in greater detail elsewhere in this disclosure.

The first slot 111 is further defined with a first slit 113. The first slit 113 is a two dimensional aperture formed along an edge of the container 110. The first slit 113 is sized such that a fastener selected from the plurality of fasteners 102 will have to be deformed in order to be inserted into the first slot 111. The purpose of this deformation is to insure that selected fastener will remain within the first slot 111 when the housing 101 is hung from the plurality of fasteners 102.

The second slot 112 is a negative space that is formed in the housing 101. The second slot 112 is formed in the shape of a rectangular block. The inner dimensions of the second slot 112 are greater than the outer dimensions of each of the plurality of fasteners 102 such that a fastener selected form the plurality of fasteners 102 may be inserted into the second slot 112. The second slot 112 comprises a third track 163 and a fourth track 164. The third track 163 is a groove that is formed parallel to a first second length direction 144 edge of the second rectangular strip 141. The fourth track 164 is a groove that is formed parallel to a second second length direction 144 edge of the second rectangular strip 141. The directional references used in this disclosure are discussed in greater detail elsewhere in this disclosure.

The second slot 112 is further defined with a second slit 114. The second slit 114 is a two dimensional aperture formed along an edge of the container 110. The second slit 114 is sized such that a fastener selected from the plurality of fasteners 102 will have to be deformed in order to be inserted into the second slot 112. The purpose of this deformation is to insure that selected fastener will remain within the second slot 112 when the housing 101 is hung from the plurality of fasteners 102.

Each of the plurality of fasteners 102 is a fastening device that attaches the housing 101 and the personal data device 191 to the vertical surface 192. Each of the plurality of fasteners 102 is stored within the housing 101 such that the plurality of fasteners 102 can be retracted into the housing 101 after use. The plurality of fasteners 102 comprises a first tab 121 and a second tab 122.

The first tab 121 is a fastener selected from the plurality of fasteners 102. The first tab 121 is a semi-rigid rectilinear strip structure. The semi-rigid strip structure is elastic in nature. The first tab 121 is inserted into the first slot 111 through the first slit 113. The first tab 121 comprises a first rectangular strip 131, a first pedestal 132, and a first hook surface 133. The first pedestal 132 comprises a first ridge 171 and a second ridge 172. The first rectangular strip 131 is further defined with a first face 181, a second face 182, a first length direction 134, and a first width direction 135. The first length direction 134 is the dimension of the first rectangular strip 131 with the greatest span. The first width direction 135 is the dimension of the first rectangular strip 131 with the second greatest span.

The first ridge 171 is the end of the first pedestal 132 that extends beyond a first length direction 134 edge of the first rectangular strip 131 such that the first ridge 171 inserts into the first track 161. The second ridge 172 is the end of the first pedestal 132 that extends beyond a first length direction 134 edge of the first rectangular strip 131 such that the second ridge 172 inserts into the second track 162. The first face 181 is the face of the first rectangular strip 131 upon which the first hook surface 133 is attached. The second face 182 is the face of the first rectangular strip 131 that is distal from the first face 181.

The first rectangular strip 131 is a rectangular structure. The first pedestal 132 is a rectangular structure that is attached to the first rectangular strip 131 along an edge that runs parallel to the first width direction 135 of the first rectangular strip 131. The vertices of the first rectangular strip 131 that are distal from the first pedestal 132 are rounded. The span of the first pedestal 132 in the first width direction 135 is greater than the span of the first rectangular strip 131 in the first width direction 135 such that the ends of the first pedestal 132 extend beyond the edges of the first rectangular strip 131 in the first width direction 135. The first hook surface 133 is a commercially available hook surface of a hook and loop fastener. Hook and loop fasteners are discussed in greater detail elsewhere in this disclosure. The first hook surface 133 is attached to the first face 181 of the first rectangular strip 131 using an adhesive.

If the vertical surface 192 is a textured textile surface, the first tab 121 is attached to the vertical surface 192 by placing the first hook surface 133 against the vertical surface 192. In this scenario, the hooks of the first hook surface 133 will attach themselves to the vertical surface 192 thereby attaching the invention 100 to the vertical surface 192. If the first hook surface 133 will not attach to the vertical surface 192, the removable pad 103 is attached to the vertical surface 192 and the first hook surface 133 is attached to the removable pad 103. The removable pad 103 is discussed in greater detail elsewhere in this disclosure.

The second tab 122 is a fastener selected from the plurality of fasteners 102. The second tab 122 is a semi-rigid rectilinear strip structure. The semi-rigid strip structure is elastic in nature. The second tab 122 is inserted into the second slot 112 through the second slit 114. The second tab 122 comprises a second rectangular strip 141, a second pedestal 142, and a second hook surface 143. The second pedestal 142 comprises a third ridge 173 and a fourth ridge 174. The second rectangular strip 141 is further defined with a third face 183, a fourth face 184, a second length direction 144, and a second width direction 145. The second length direction 144 is the dimension of the second rectangular strip 141 with the greatest span. The second width direction 145 is the dimension of the second rectangular strip 141 with the second greatest span.

The third ridge 173 is the end of the second pedestal 142 that extends beyond a second length direction 144 edge of the second rectangular strip 141 such that the third ridge 173 inserts into the third track 163. The fourth ridge 174 is the end of the second pedestal 142 that extends beyond a second length direction 144 edge of the second rectangular strip 141 such that the fourth ridge 174 inserts into the fourth track 164. The third face 183 is the face of the second rectangular strip 141 upon which the second hook surface 143 is attached. The fourth face 184 is the face of the second rectangular strip 141 that is distal from the third face 183.

The second rectangular strip 141 is a rectangular structure. The second pedestal 142 is a rectangular structure that is attached to the second rectangular strip 141 along an edge that runs parallel to the second width direction 145 of the second rectangular strip 141. The vertices of the second rectangular strip 141 that are distal from the second pedestal 142 are rounded. The span of the second pedestal 142 in the second width direction 145 is greater than the span of the second rectangular strip 141 in the second width direction 145 such that the ends of the second pedestal 142 extend beyond the edges of the second rectangular strip 141 in the second width direction 145. The second hook surface 143 is a commercially available hook surface of a hook and loop fastener. Hook and loop fasteners are discussed in greater detail elsewhere in this disclosure. The second hook surface 143 is attached to the third face 183 of the second rectangular strip 141 using an adhesive.

If the vertical surface 192 is a textured textile surface, the second tab 122 is attached to the vertical surface 192 by placing the second hook surface 143 against the vertical surface 192. In this scenario, the hooks of the second hook surface 143 will attach themselves to the vertical surface 192 thereby attaching the invention 100 to the vertical surface 192. If the second hook surface 143 will not attach to the vertical surface 192, the removable pad 103 is attached to the vertical surface 192 and the second hook surface 143 is attached to the removable pad 103. The removable pad 103 is discussed in greater detail elsewhere in this disclosure.

The first slot 111 and the second slot 112 are identical. The first tab 121 and the second tab 122 are identical. As shown most clearly in FIG. 6, to insert the first tab 121 into the first slot 111, the first tab 121 is deformed into an arch shape such that the first ridge 171 and the second ridge 172 of the first pedestal 132 will fit through the first slit 113 into the first track 161 and the second track 162 respectively. When the first tab 121 returns to its relaxed shape, the first pedestal 132 will prevent the first tab 121 from falling out of the first slot 111 during use of the invention 100.

To insert the second tab 122 into the second slot 112, the second tab 122 is deformed into an arch shape such that the third ridge 173 and the fourth ridge 174 of the second pedestal 142 will fit through the second slit 114 into the third track 163 and the fourth track 164 respectively. When the second tab 122 returns to its relaxed shape, the second pedestal 142 will prevent the second tab 122 from falling out of the second slot 112 during use of the invention 100.

Figure 5:
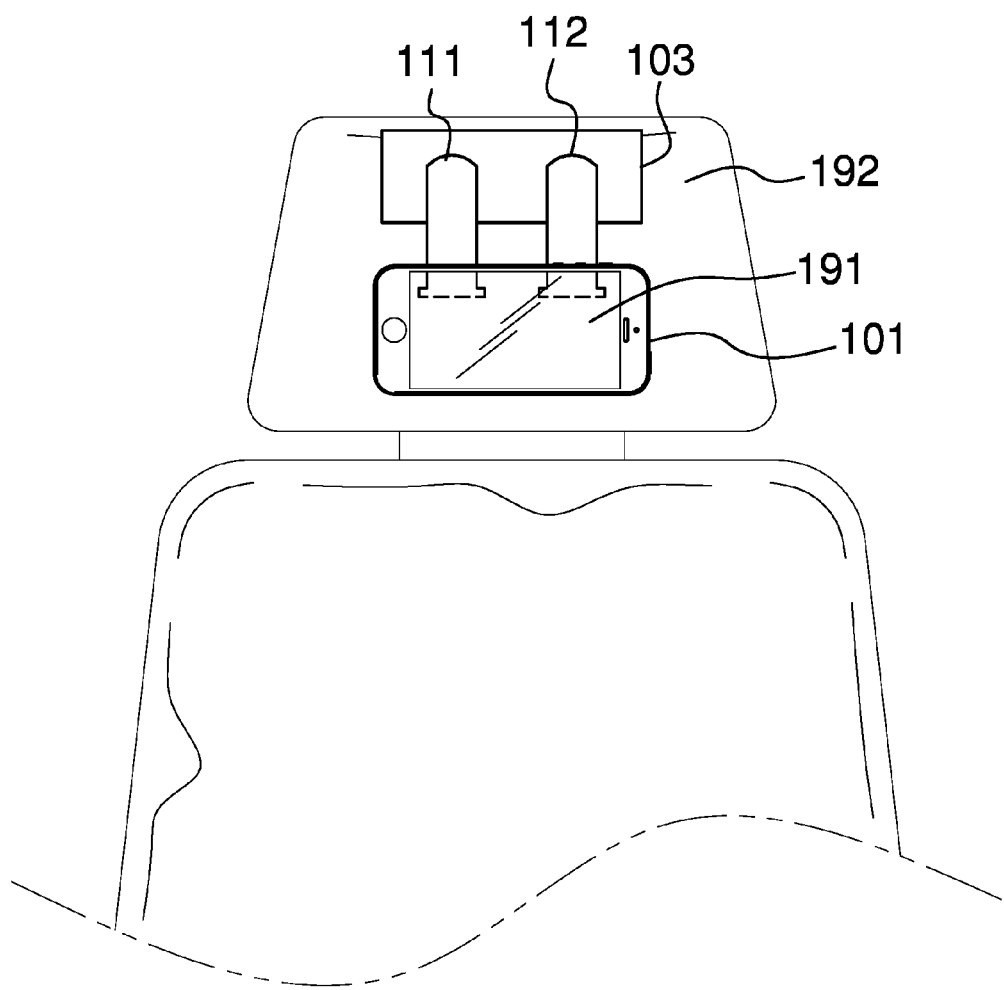
FIG. 5 is an in use view of an embodiment of the disclosure.
Figure 6:
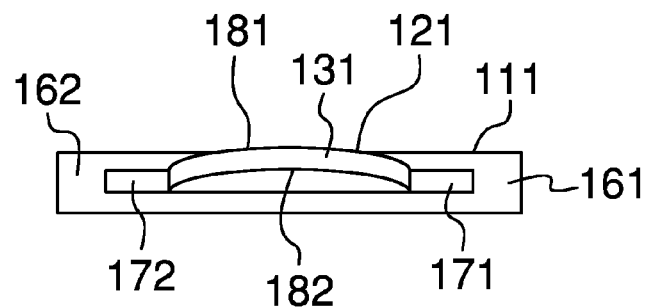
FIG. 6 is a detail view of an embodiment of the disclosure.

As shown most clearly in FIG. 5, the removable pad 103 is a device that is removably attached to the vertical surface 192. The removable pad 103 forms an anchor point for the plurality of fasteners 102 in circumstances when the plurality of fasteners 102 cannot be directly attached to the vertical surface 192. The removable pad 103 comprises a plate 151, a removable adhesive 152, and a loop surface 153. The plate 151 is further defined with a fifth face 185 and a sixth face 186. The fifth face 185 is the face of the plate 151 upon which the loop surface 153 is attached. The sixth face 186 is the face of the plate 151 that is distal from the fifth face 185.

Figure 7:
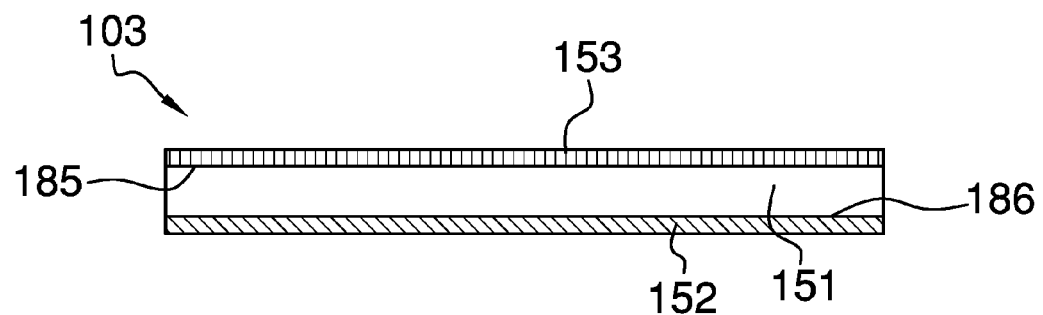
FIG. 7 is a detail view of an embodiment of the disclosure.

As shown most clearly in FIG. 7, the plate 151 is a rectangular semi-rigid structure that is attached to the vertical surface 192 when the plurality of fasteners 102 cannot otherwise attach to the vertical surface 192. The removable adhesive 152 is an adhesive material that is applied to the sixth face 186 of the plate 151. The removable adhesive 152 is selected such that the plate 151 can be reused and repositioned during use of the invention 100. Removable adhesives are commercially available products that are discussed in greater detail elsewhere in this disclosure. The removable pad 103 attaches to the vertical surface 192 by pressing the sixth face 186 of the plate 151 against the vertical surface 192. The loop surface 153 is a commercially available loop surface 153 of a hook and loop fastener. Hook and loop fasteners are discussed in greater detail elsewhere in this disclosure. The loop surface 153 is attached to the fifth face 185 of the plate 151 using an adhesive.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Anchor: As used in this disclosure, anchor means to hold an object firmly or securely.

Anchor Point: As used in this disclosure, an anchor point is a location to which a first object can be securely attached to a second object.

Elastic: As used in this disclosure, an elastic is a material or object that deforms when a force is applied to it and that is able to return to its relaxed shape after the force is removed. A material that exhibits these qualities is also referred to as an elastomeric material.

Fastener: As used in this disclosure, a fastener is a device that is used to join or affix two objects. Fasteners generally comprise a first element which is attached to the first object and a second element which is attached to the second object such that the first element and the second element join to affix the first object and the second object. Common fasteners include, but are not limited to, hooks, zippers, snaps, buttons, buckles, quick release buckles, or hook and loop fasteners.

Force Of Gravity: As used in this disclosure, the force of gravity refers to a vector that indicates the direction of the pull of gravity on an object at or near the surface of the earth.

Handheld: As used in this disclosure, when referring to an item or device, handheld means that the item or device is small and light enough to be operated while a person holds the item or device in their hands.

Hands Free: As used in this disclosure, hands free refers to a design characteristic of a device that allows the device to be used or operated without the use of the hands.

Hang: As used in this disclosure, to hang an object is to suspend an object above a surface from above such that the inferior end of the object can move freely.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Housing: As used in this disclosure, a housing is a rigid casing that encloses and protects one or more devices.

Inner Dimension: As used in this disclosure, the term inner dimension describes the span from a first inside or interior surface of a container to a second inside or interior surface of a container. The term is used in much the same way that a plumber would refer to the inner diameter of a pipe.

Negative Space: As used in this disclosure, negative space is a method of defining an object through the use of open or empty space as the definition of the object itself, or, through the use of open or empty space to describe the boundaries of an object.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

PDD: As used in this disclosure, PDD is an acronym for personal data device.

Personal Data Device: As used in this disclosure, a personal data device is a handheld device that is used for managing personal information and communication. Examples of personal data device include, but are not limited to, cellular phones, tablets and smart phones.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk like appearance. As defined in this disclosure, plates may be made of any material, but are commonly made of metal. When made of wood, a plate is often referred to as a board.

Removable Adhesive: As used in this disclosure, a removable adhesive is a commercially available adhesive that is designed with a lower tack, or stickiness, such that a first object is attached to a second object with a removable adhesive the first object can be readily removed in a manner that ideally, though not necessarily practically, leaves behind no adhesive residue on the second object. A repositionable adhesive is a subset of removable adhesives that are intended to allow the first object to be reattached to a third object or the second object in the initial or a different position. Within this disclosure, a removable adhesive is assumed to include repositionable adhesives.

Ridge: As used in this disclosure, a ridge is an extended portion of a structure.

Semi-Rigid Structure: As used in this disclosure, a semi-rigid structure is a solid structure that is stiff but not wholly inflexible and that will deform under force before breaking. A semi-rigid structure may or may not behave in an elastic fashion in that a semi-rigid structure need not return to a relaxed shape.

Slit: As used in this disclosure, a slit is a long narrow cut or opening that is formed in or through an object.

Slot: As used in this disclosure, a slot is a long narrow groove or aperture that is formed in an object.

Strip: As used in this disclosure, the term describes a long thin object of uniform width. Strips are often rectangular blocks in shape.

Track: As used in this disclosure, a track is a slot that is formed in a surface of a first object that is formed to receive a ridge formed in a second object for the purpose of fastening the second object to the first object.

Truncated: As used in this disclosure, a geometric object is truncated when an apex, vertex, or end is cut off by a line or plane.

Vertex: As used in this disclosure, a vertex (plural vertices) is an angle that is formed by two lines that form a point. Vertices are commonly found in polygons.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A travel case comprising:

wherein the travel case comprises a housing and a plurality of fasteners;

wherein the plurality of fasteners are retractably installed within the housing;

wherein the travel case is configured for use with a personal data device;

wherein the housing contains the personal data device;

wherein the travel case is configured for use with a vertical surface;

wherein the travel case contains the personal data device;

wherein each of the plurality of fasteners attach the housing to a vertical surface such that the personal data device may be hung from the vertical surface;

wherein the housing is a rigid structure;

wherein the housing comprises a container, a first slot, and a second slot;

wherein the first slot and the second slot are formed within the container;

wherein the container is a semi-rigid hollow rectangular block structure;

wherein the container is formed with an open face;

wherein the semi-rigid structure of the container is elastic in nature;

wherein the first slot is a negative space that is formed in the housing;

wherein the first slot is formed in the shape of a rectangular block;

wherein the first slot is further defined with a first inner dimensions;

wherein the first inner dimensions of the first slot are greater than the outer dimensions of each of the plurality of fasteners such that a fastener selected from the plurality of fasteners may be inserted into the first slot;

wherein the second slot is a negative space that is formed in the housing;

wherein the second slot is formed in the shape of a rectangular block;

wherein the second slot is further defined with a second inner dimensions;
wherein the second inner dimensions of the first slot are greater than the outer dimensions of each of the plurality of fasteners such that a fastener selected from the plurality of fasteners may be inserted into the second slot;
wherein the first slot is further defined with a first slit;
wherein the first slit is a two dimensional aperture formed along a first edge of the container;
wherein the first slit is sized such that a fastener selected from the plurality of fasteners will have to be deformed in order to be inserted into the first slot;
wherein the second slot is further defined with a second slit;
wherein the second slit is a two dimensional aperture formed along the first edge of the container;
wherein the second slit is sized such that a fastener selected from the plurality of fasteners will have to be deformed in order to be inserted into the second slot.

2. The travel case according to claim 1
wherein the first slot comprises a first track and a second track;
wherein the second slot comprises a third track and a fourth track;
wherein the first track is a groove that is formed in the first slot;
wherein the second track is a groove that is formed in the first slot;
wherein the third track is a groove that is formed in the second slot;
wherein the fourth track is a groove that is formed in the second slot.

3. The travel case according to claim 2
wherein the plurality of fasteners comprises a first tab and a second tab;
wherein the first tab is a fastener selected from the plurality of fasteners;
wherein the first tab is a semi-rigid rectilinear strip structure;
wherein the second tab is a fastener selected from the plurality of fasteners;
wherein the second tab is a semi-rigid rectilinear strip structure;
wherein the semi-rigid strip structures are elastic in nature;
wherein the first tab is inserted into the first slot through the first slit;
wherein the second tab is inserted into the second slot through second slit.

4. The travel case according to claim 3
wherein the first tab comprises a first rectangular strip, a first pedestal, and a first hook surface;
wherein the first pedestal comprises a first ridge and a second ridge;
wherein the first rectangular strip is further defined with a first face, a second face, a first length direction, and a first width direction;
wherein the first length direction is the dimension of the first rectangular strip with the greatest span;
wherein the first width direction is the dimension of the first rectangular strip with the second greatest span;
wherein the span of the first pedestal in the first width direction is greater than the span of the first rectangular strip in the first width direction such that the ends of the first pedestal extend beyond the edges of the first rectangular strip in the first width direction;
wherein the first ridge is the end of the first pedestal that extends beyond a first length direction edge of the first rectangular strip such that the first ridge inserts into the first track;
wherein the second ridge is the end of the first pedestal that extends beyond a first length direction edge of the first rectangular strip such that the second ridge inserts into the second track;
wherein the first hook surface is hook surface of a hook and loop fastener;
wherein the first hook surface attaches to the first face;
wherein the second tab comprises a second rectangular strip, a second pedestal, and a second hook surface;
wherein the second pedestal comprises a third ridge and a fourth ridge;
wherein the second rectangular strip is further defined with a third face, a fourth face, a second length direction, and a second width direction;
wherein the second length direction is the dimension of the second rectangular strip with the greatest span;
wherein the second width direction is the dimension of the second rectangular strip with the second greatest span;
wherein the span of the second pedestal in the second width direction is greater than the span of the second rectangular strip in the second width direction such that the ends of the second pedestal extend beyond the edges of the second rectangular strip in the second width direction;
wherein the third ridge is the end of the second pedestal that extends beyond a second length direction edge of the second rectangular strip such that the third ridge inserts into the third track;
wherein the fourth ridge is the end of the second pedestal that extends beyond a second length direction edge of the second rectangular strip such that the fourth ridge inserts into the fourth track;
wherein the second hook surface is hook surface of a hook and loop fastener;
wherein the second hook surface attaches to the third face.

5. The travel case according to claim 4
wherein the groove of the first track is formed parallel to a first first length direction edge of the first rectangular strip;
wherein the groove of the second track is formed parallel to a second first length direction edge of the first rectangular strip;
wherein the groove of the third track is formed parallel to a first second length direction edge of the second rectangular strip;
wherein the groove of the fourth track is formed parallel to a second second length direction edge of the second rectangular strip.

6. The travel case according to claim 5
wherein the first rectangular strip is a rectangular structure;
wherein the first pedestal is a rectangular structure that is attached to the first rectangular strip along an edge that runs parallel to the first width direction of the first rectangular strip;
wherein the vertices of the first rectangular strip that are distal from the first pedestal are rounded;
wherein the second rectangular strip is a rectangular structure;
wherein the second pedestal is a rectangular structure that is attached to the second rectangular strip along an edge that runs parallel to the second width direction of the second rectangular strip;

wherein the vertices of the second rectangular strip that are distal from the second pedestal are rounded.

7. The travel case according to claim 6
wherein the first slot and the second slot are identical;
wherein the first tab and the second tab are identical;
wherein to insert the first tab into the first slot the first tab is deformed into an arch shape such that the first ridge and the second ridge of the first pedestal will fit through the first slit into the first track and the second track respectively;
wherein to insert the second tab into the second slot, the second tab is deformed into an arch shape such that the third ridge and the fourth ridge of the second pedestal will fit through the second slit into the third track and the fourth track respectively.

8. The travel case according to claim 7
wherein the travel case further comprises a removable pad
wherein the removable pad removably attaches to the vertical surface;
wherein the removable pad provides an anchor point for use by the plurality of fasteners.

9. The travel case according to claim 8
wherein the removable pad comprises a plate, a removable adhesive, and a loop surface;
wherein the plate is further defined with a fifth face and a sixth face;
wherein the plate is a rectangular semi-rigid structure that is attached to the vertical surface;
wherein the removable adhesive is an adhesive material that is applied to the sixth face of the plate;
wherein the loop surface is a loop surface of a hook and loop fastener.

10. The travel case according to claim 1
wherein the travel case further comprises a removable pad
wherein the removable pad removably attaches to the vertical surface;
wherein the removable pad provides an anchor point for use by the plurality of fasteners;
wherein the removable pad comprises a plate, a removable adhesive, and a loop surface;
wherein the plate is further defined with a fifth face and a sixth face;
wherein the plate is a rectangular semi-rigid structure that is attached to the vertical surface;
wherein the removable adhesive is an adhesive material that is applied to the sixth face of the plate;
wherein the loop surface is a loop surface of a hook and loop fastener;
wherein the loop surface is attached to the fifth face of the plate using an adhesive.

11. The travel case according to claim 10
wherein the housing is a rigid structure;
wherein the housing comprises a container, a first slot, and a second slot;
wherein the first slot and the second slot are formed within the container;
wherein the container is a semi-rigid hollow rectangular block structure;
wherein the container is formed with an open face;
wherein the semi-rigid structure of the container is elastic in nature;
wherein the first slot is a negative space that is formed in the housing;
wherein the first slot is formed in the shape of a rectangular block;
wherein the first slot is further defined with a first inner dimensions;
wherein the first inner dimensions of the first slot are greater than the outer dimensions of each of the plurality of fasteners such that a fastener selected from the plurality of fasteners may be inserted into the first slot;
wherein the second slot is a negative space that is formed in the housing;
wherein the second slot is formed in the shape of a rectangular block;
wherein the second slot is further defined with a second inner dimensions;
wherein the second inner dimensions of the first slot are greater than the outer dimensions of each of the plurality of fasteners such that a fastener selected from the plurality of fasteners may be inserted into the second slot;
wherein the first slot is further defined with a first slit;
wherein the first slit is a two dimensional aperture formed along a first edge of the container;
wherein the first slit is sized such that a fastener selected from the plurality of fasteners will have to be deformed in order to be inserted into the first slot;
wherein the second slot is further defined with a second slit;
wherein the second slit is a two dimensional aperture formed along the first edge of the container;
wherein the second slit is sized such that a fastener selected from the plurality of fasteners will have to be deformed in order to be inserted into the second slot;
wherein the first slot comprises a first track and a second track;
wherein the second slot comprises a third track and a fourth track;
wherein the first track is a groove that is formed in the first slot;
wherein the second track is a groove that is formed in the first slot;
wherein the third track is a groove that is formed in the second slot;
wherein the fourth track is a groove that is formed in the second slot.

12. The travel case according to claim 11
wherein the plurality of fasteners comprises a first tab and a second tab;
wherein the first tab is a fastener selected from the plurality of fasteners;
wherein the first tab is a semi-rigid rectilinear strip structure;
wherein the second tab is a fastener selected from the plurality of fasteners;
wherein the second tab is a semi-rigid rectilinear strip structure;
wherein the semi-rigid strip structures are elastic in nature;
wherein the first tab is inserted into the first slot through the first slit;
wherein the second tab is inserted into the second slot through second slit.

13. The travel case according to claim 12
wherein the first tab comprises a first rectangular strip, a first pedestal, and a first hook surface;
wherein the first pedestal comprises a first ridge and a second ridge;
wherein the first rectangular strip is further defined with a first face, a second face, a first length direction, and a first width direction;
wherein the first length direction is the dimension of the first rectangular strip with the greatest span;

wherein the first width direction is the dimension of the first rectangular strip with the second greatest span;

wherein the span of the first pedestal in the first width direction is greater than the span of the first rectangular strip in the first width direction such that the ends of the first pedestal extend beyond the edges of the first rectangular strip in the first width direction;

wherein the first ridge is the end of the first pedestal that extends beyond a first length direction edge of the first rectangular strip such that the first ridge inserts into the first track;

wherein the second ridge is the end of the first pedestal that extends beyond a first length direction edge of the first rectangular strip such that the second ridge inserts into the second track;

wherein the first hook surface is hook surface of a hook and loop fastener;

wherein the first hook surface attaches to the first face;

wherein the second tab comprises a second rectangular strip, a second pedestal, and a second hook surface;

wherein the second pedestal comprises a third ridge and a fourth ridge;

wherein the second rectangular strip is further defined with a third face, a fourth face, a second length direction, and a second width direction;

wherein the second length direction is the dimension of the second rectangular strip with the greatest span;

wherein the second width direction is the dimension of the second rectangular strip with the second greatest span;

wherein the span of the second pedestal in the second width direction is greater than the span of the second rectangular strip in the second width direction such that the ends of the second pedestal extend beyond the edges of the second rectangular strip in the second width direction;

wherein the third ridge is the end of the second pedestal that extends beyond a second length direction edge of the second rectangular strip such that the third ridge inserts into the third track;

wherein the fourth ridge is the end of the second pedestal that extends beyond a second length direction edge of the second rectangular strip such that the fourth ridge inserts into the fourth track;

wherein the second hook surface is hook surface of a hook and loop fastener;

wherein the second hook surface attaches to the third face.

14. The travel case according to claim 13 wherein the groove of the first track is formed parallel to a first first length direction edge of the first rectangular strip;

wherein the groove of the second track is formed parallel to a second first length direction edge of the first rectangular strip;

wherein the groove of the third track is formed parallel to a first second length direction edge of the second rectangular strip;

wherein the groove of the fourth track is formed parallel to a second length direction edge of the second rectangular strip.

15. The travel case according to claim 14 wherein the first rectangular strip is a rectangular structure;

wherein the first pedestal is a rectangular structure that is attached to the first rectangular strip along an edge that runs parallel to the first width direction of the first rectangular strip;

wherein the vertices of the first rectangular strip that are distal from the first pedestal are rounded;

wherein the second rectangular strip is a rectangular structure;

wherein the second pedestal is a rectangular structure that is attached to the second rectangular strip along an edge that runs parallel to the second width direction of the second rectangular strip;

wherein the vertices of the second rectangular strip that are distal from the second pedestal are rounded.

16. The travel case according to claim 15 wherein the first slot and the second slot are identical;

wherein the first tab and the second tab are identical;

wherein to insert the first tab into the first slot the first tab is deformed into an arch shape such that the first ridge and the second ridge of the first pedestal will fit through the first slit into the first track and the second track respectively;

wherein to insert the second tab into the second slot, the second tab is deformed into an arch shape such that the third ridge and the fourth ridge of the second pedestal will fit through the second slit into the third track and the fourth track respectively.

* * * * *